May 28, 1940.  R. R. WARD  2,202,177

CUTTING MACHINE

Filed July 5, 1938  2 Sheets-Sheet 1

Inventor
RAYMOND R. WARD

By

ATTORNEYS

May 28, 1940.  R. R. WARD  2,202,177
CUTTING MACHINE
Filed July 5, 1938   2 Sheets-Sheet 2
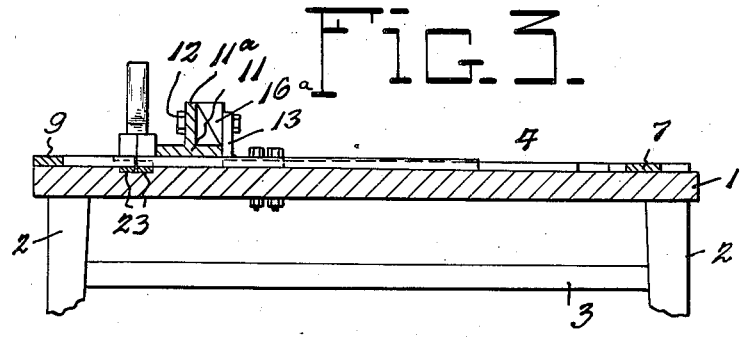
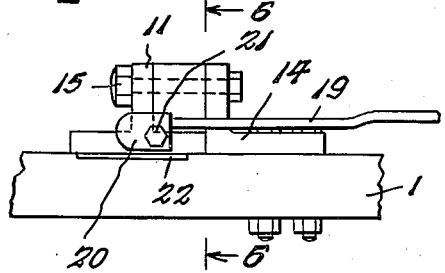
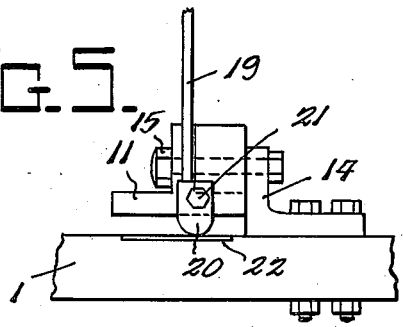
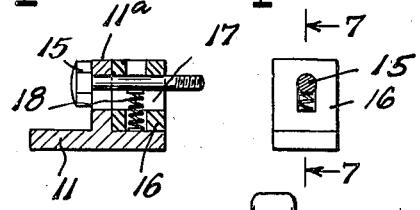
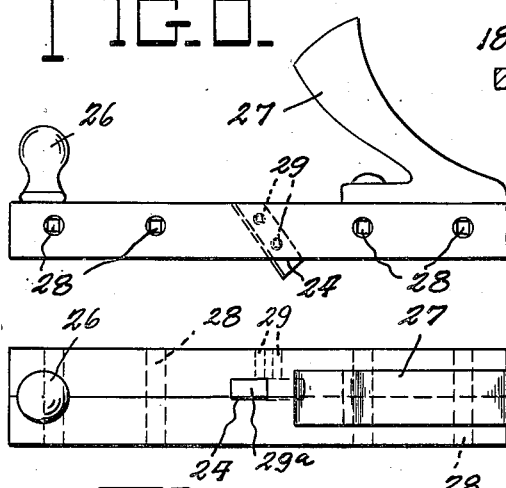
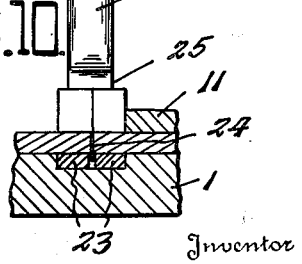
Inventor
RAYMOND R. WARD
By
ATTORNEYS Patented May 28, 1940

2,202,177

UNITED STATES PATENT OFFICE 2,202,177

CUTTING MACHINE

Raymond R. Ward, Cleveland, Ohio, assignor to George W. DeWees, Cleveland, Ohio

Application July 5, 1938, Serial No. 217,523

9 Claims. (Cl. 164—73)

The present invention deals with certain problems that arise in the cutting of rubber, linoleum, or the like, desired to be used in cut forms for floor, wall, drainboard, or like tiles.

So far as I am aware, cutting equipment heretofore used for the above purposes does not provide efficient performance in order to so cut the edges of the tiles or other forms that they may fit together at the edges in such perfect manner as is required in the laying or application of these tiles to a base, wall, or the like in order to provide a highly finished job wherein the tile edges meet prefectly to provide the desired continuous surface.

In the use of the former equipment employed for the purposes of cutting linoleum or the like, the cutting means availed of is such that the rubber, linoleum, or like material at its outer surface tends to be lifted from the plane of the body of the surface, as one defective result. Again, there is difficulty in effecting cuts in straight lines. Additionally, where the material employed, as for instance linoleum, is mounted upon a fabric base, adhesively or otherwise combined therewith, difficulty arises in cutting the fabric or fabric material cleanly so that it is not shredded, so to speak, in such a manner that it has a tendency to lodge between the intended matching edges of associated tiles, thus interfering with the bringing of the edges so closely together as to provide against forming of cracks or interstices between the tiles.

My invention is designed to overcome the difficulties that have arisen heretofore and involving the problems above outlined, as well as other difficulties that are experienced in the particular kind of work for which my invention is designed.

Now in order to overcome said difficulties, I have devised a method of cutting such materials as above referred to while the body of the material adjacent to and at opposite sides of the line of cut is subjected to pressure thereon contiguous to the line of cut or up to the sides of the cutting knife by which the cut is effected. In this way the said material is held by positive pressure in a flat condition so that it is impossible for the action of the knife, as it is drawn through the material, to elevate or lift the material at the line of cut edges thereof so as to prevent the later perfectly tight fitting of the edges of separate pieces of material that may constitute tiles, or the like, in forming the desired continuous or unbroken surface.

In carrying out the method which I propose as above mentioned, I employ certain novel mechanical instrumentalities, an important one of which is a blade or cutting knife of utmost thinness, peculiarly mounted upon an operating member which effects the compressing action on the surface of the material in the cutting operation, and peculiarly guided so as to avoid any liability of lateral play, wobbling, or vibration of the blade or cutting knife in the cutting operation.

My invention contemplates, generally speaking, a machine structure by which the desired actions above referred to are effected, and including a knife operating unit having utility as the cutting means of the machine when combined with other mechanical instrumentalities, said unit, however, being susceptible of independent use as a cutting appliance generally adapted for the cutting of rubber, linoleum, or the like.

By the employment of a machine and cutting unit as above referred to, according to my invention, large pieces of material as well as small may be operated upon. Especially is the machine and said unit adapted for the handling of cutting operations on small pieces of waste material of rubber sheets, linoleum, or the like, after larger sections of such material have been cut in the making of larger tiles, etc.

In the accompanying drawings my invention is illustrated in its preferred embodiment, and Figure 1 is a plan view of a machine involving the principle of operation or method referred to by me and mechanical instrumentalities for carrying out said method of cutting.

Figure 3 is a transverse vertical section taken about on the line 3—3 of Figure 1, looking in the direction of the arrows.

Figure 4 is a detail fragmentary view looking toward an end of the machine, and bringing out a little more clearly the lifting cam device employed for raising and lowering the spring presser plate, the plate being in its lowered position as illustrated.

Figure 5 is a view similar to Figure 4, but showing the presser plate elevated by the cam lever.

Figure 6 is a vertical section on the line 6—6 of Figure 4, omitting certain parts.

Figure 7 is a sectional view taken about on the line 7—7 of Figure 6 and illustrating details more clearly.

Figure 8 is a side elevation view of the cutting device or unit alone.

Figure 9 is a top plan view of the device of Figure 8.

Figure 10 is a cross sectional view, fragmentary in nature, illustrating how the cutting knife of the cutting device operates through the material, is held at its upper portion by the cutting device in a rigid manner, and is similarly rigidly guided at its lower extremity by suitable means on the base of the machine.

Figures 1, 2:
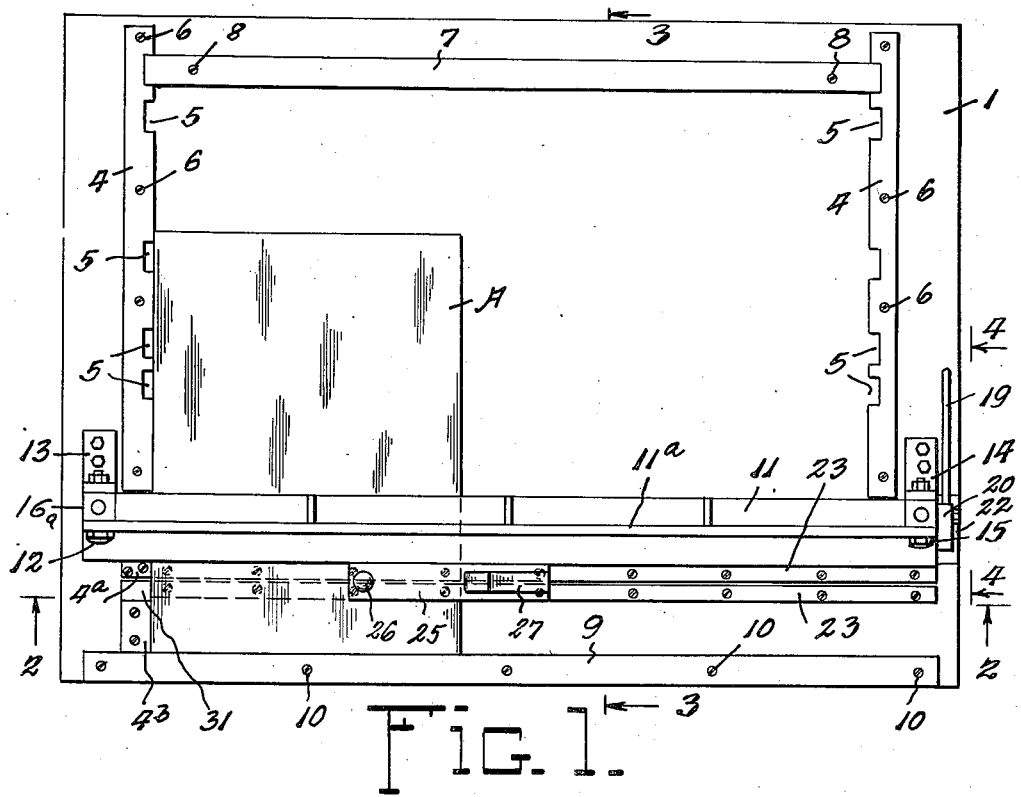
Figure 2 is a vertical longitudinal sectional view of the machine, taken about on the line 2—2 of Figure 1, looking in the direction of the arrows.

Figures 1, 2, and 3 generally illustrate the machine structure, and referring thereto, 1 denotes the base, 2 the supporting legs, and 3 the bracing means employed for the legs upon which the base is mounted. The base 1 may be made of any suitable material, either wood or metal, but preferably the former, and carried upon the base, nearer to one side thereof, are the transverse abutment plates or bars 4 formed with notches 5 at their inner edges and screwed or otherwise attached, as at 6, to the base 1. Adjustable between the abutment plates 4 and adapted to be accurately positioned in reference thereto by the ends thereof being entered in the notches 5, is a longitudinal plate or bar 7 adapted to be moved closer to or farther from the presser plate, now to be described, by release or removal of the fastenings 8 and interlocking of the ends of the members 7 with the parts 4, as self-evident from the drawings. Adjacent to one edge of the base is fixed the stationary abutment plate 9 by means of fastenings 10, said plate having a function similar to the adjustable abutment plate 7, as will later be described.

Between the plates 7 and 9, and more adjacent to the plate 9, is located the spring presser plate 11. This plate 11 may be described as of somewhat T-form, having a horizontal base portion and a medial upwardly extending flange 11a. By means of the flange 11a and block 16a welded to the presser plate 11, the latter is vertically movable and resiliently pivotally connected by a bolt 12 to the vertical portion of an angle bracket 13, see Figures 1 and 2, the bolt 12 forming a resilient pivot enabling the presser plate 11 to be rocked slightly upwardly and downwardly for the purpose of facilitating the introduction of a piece of material to be cut into the space between the upper surface of the base 1 and the under surface of the plate 11, as will later be described more fully.

The end of the presser plate 11 remote from the pivotal axis 12 is supported for slight vertical movement by a bracket plate 14. Passing through the vertical portion of the bracket plate 14 is a bolt 15, and on the presser plate is welded a block 16 having a horizontal opening 17 of greater vertical dimension than the diameter of the bolt 15. The horizontal dimension of the opening 17 is equal or only slightly larger than the diameter of the bolt 15. Seated on the upper side of the presser plate 11 is a spring 18 which bears at its upper end against the under side of the bolt 15 and tends to hold the presser plate 11 downward against the work that may be emplaced therebeneath.

However, the presser plate 11 is equipped at its end adjacent to the bracket 14 with a cam lever 19, the cam portion 20 of which is pivoted to said end of the presser plate at 21. By rocking the lever 19 upwardly, its cam 20 is adapted to contact with the base 1 or any suitable part thereon, such as the plate 22, thus to elevate the end of the presser plate 11 carrying the cam lever to rock the same upwards about the pivot axis 12. The movement of the presser plate on raising the cam lever 19 is caused by the action of the lever cam 20 compressing the spring 18 by the lifting of the plate 11. When the lever 19 is moved downwards, the spring 18 will force the presser plate downwards to effect the pressure of the latter upon material to be cut and which is previously disposed beneath the presser plate 11 when the latter is slightly raised or rocked upwards.

Adjacent to the presser plate 11 and countersunk in the base 1 so that their surfaces are flush with the surface of the base 1, are the knife guiding plates 23 spaced apart only sufficiently to permit the passage therethrough in fairly close contacting relation of the knife or blade 24 of the cutting device 25. The knife guiding plates 23 are so closely arranged, as stated, in order that they may support with a rigid action the extremely thin knife or blade 24 mentioned as this knife is moved longitudinally of the base or bed 1 of the machine in effecting the cutting operation.

Now the cutting device 25 is of peculiar form, and is a unit of itself in that it comprises a relatively long body having a vertical handle 26 near one end to be grasped by the operator, and equipped at its other end with a larger and forwardly inclining handle 27 similarly to be grasped by the operator. In other words, the two handles 26 and 27 will be grasped by the two hands of the operator separately, very much after the manner in which similar handles of an ordinary plane are grasped in moving a plane over the surface of a board or the like.

The body of the cutting device 25 is made up of two longitudinal separate sections which are clamped together by means of horizontal bolts or like fastenings 28. The cutting knife or blade 24 is clamped between the sections of the device 25, as clearly seen in Figures 2, 8, and 9, and, if desired, the position of the knife 24 may be fixed by set screws 29 acting upon a clamping plate 29a. It is of importance that the cutting edge of the knife 24 shall be inclined when it is positioned on the device 25 for facilitating the making of a clean cut of the material on the line of cut, as the cutting device is moved after the manner of a plane in planing wood, longitudinally of the base 1 upon which it is guided by means of the guide plates 23.

One of the abutment plates 4 is made in sections, 4, 4a, and 4b, and the section 4b is provided with a recess 31 lessening the thickness of the section at such portion. Likewise, the section 4a is thinner vertically than the parts 4 and 4b, the purpose of this being to permit the cutting device 25 to move sufficiently that the knife 24 may pass between the parts 4a and 4b in completing the cut. The purpose in having the part 4a thinner than the member 4 and the member 4b thinner at the recess 31 is to permit the cutting device to operate beyond the members 4a and 4b when handling material which is thinner than the vertical thickness of the members 4 and 4b.

In the operation of my machine, the preferred use thereof contemplates that the operator shall first raise the cam lever 19, thereby moving the presser plate 11 to an upwardly adjusted inclined position sufficiently to space the same from the base 1 to permit of readily introducing a piece of material to be cut, designated A in Figure 1, beneath the presser plate 11, so that the material abuts at one edge with the transverse abutment plate members 4, 4a, and 4b.

Also, the piece of material will be positioned in abutment with the longitudinal abutment plate 9. Thereafter the cam lever 19 is lowered and the presser plate 11 preses firmly down under the action of the spring 18 against the surface of the material A, firmly holding the latter from any movement. It is assumed, of course, that the material A is to be cut along the line of the separation between the guide plates 23.

The cutting device is supported above the guide plates with the body thereof in firm contact with the surface of the material A and with the knife thereof partly entering at its lower end the space between the guide plates 23. The inner side of the cutting device 25 is held firmly against the adjacent edge of the bottom portion of the presser plate 11 so that the cutting device is guided in a two-fold manner, namely, by its co-action with the presser plate and by the action of the knife 24 entering the space between the guide plates 23. The cutting device now being firmly grasped by the handles 26 and 27, it is given the movement of a plane, leftwise, as seen in Figure 1 and Figure 2, and the knife 24 is thus drawn through the material to effect the clean cutting action desired.

Now it is important to note that the cutting device 25 as it rests upon the material is pressed hard down on the surface of the latter so that the sections of the cutting device bear against the material at opposite sides of the knife closely to the line of cut of the knife, and thus prevent any possibility of the cutting action of the knife raising the surface portion of the material in the cutting operation. In this way a clean square cut of the material is effected, and the edge of the material which is severed is so straight and square that when it is matched with another section of material similarly cut, there will be a perfect fitting contact with not even the slightest likelihood of producing a crack or interstice of any kind between the matching parts that make up the tile or other form that are going to be used when the cutting operations on the material are completed.

After the material has been cut in the manner exemplified by Figures 1 and 2 to produce a cut section of definite width, the material may be shifted in its position to render a fresh portion thereof ready for subsequent cutting action. The manipulation of the material cut is obvious from the drawings and the foregoing description.

If desired, the material A, as seen in Figure 1, may be caused to abut at its edge remote from the presser plate with the abutment plate 7 positioned at any desired point of adjustment co-acting with the notches 5, and larger sections of material may be thus cut if desired, in a self-evident manner.

After each cutting operation on the material A the cam lever 19 will be raised to release the material and permit the operator to shift it on the base 1 ready for a new cut.

By reason of the construction of the cutting equipment as described, the knife 24 may be made exceedingly thin and will be maintained in its straight cutting path throughout its severing movement, both above and below the material operated on. Furthermore, its cutting action is thus equally efficient on the fabric base of such material as at the surface portion thereof, preventing shredding of the fabric into string ends as at present found so undesirable. And since the operator bears down on the cutting device 25 in its cutting stroke, the under surface of the device has a progressive ironing effect on the material at the edges of the cut, as well as remote from such edges, thus ensuring a clean square cut, so to speak, which is so necessary for the purposes of the invention.

The bracket 13, block 16a, and bolt 12 are of the same construction as bracket 14, block 16, and bolt 15, and a spring such as spring 18 is interposed between block 16a and bolt 12 for purposes referred to already in the above in regard to parts 16 and 15.

If desired, a cam lever such as 19 may also be pivotally mounted on the block 16a and in such case both cam levers may be operated manually or in any other way, preferably simultaneously, to cause raising of the presser plate against the action of the springs 18.

The lift of the cam lever need only be small, sufficient, however, to permit introduction of material to be cut. Depending upon the thickness of the material, it may be necessary to elevate the brackets 13 and 14 somewhat by placing shims thereunder. This will position the presser plate in such a way that the material to be worked upon may be easily introduced thereunder when the cam lever or levers are manipulated to raise the presser plate. However, the brackets 13 and 14 should always be in such position as to permit sufficient pressure to be exerted upon the material to maintain the same in proper fixed position during the working operation of the device.

Having thus described my invention, what I claim as new and desire to secure by Letters Patent of the United States, is—

1. The method of cutting material into sections requiring closely contacting abutting edges, which consists in supporting the material upon a suitable base, progressively subjecting the material to an ironing out surface pressure acting directly upon the material and at opposite sides of the line of cut with a sliding movement therefrom contiguous to the line of cut at opposite sides thereof, cutting the material while thus held under such pressure, and mechanically holding the cutting instrumentality performing the cutting action against lateral play by application of force to the said instrumentality above and below the material.

2. In a machine for cutting rubber, linoleum, or the like, in combination, a cutting base, a presser plate movable upon the base, means to clamp the plate against work on the base, closely spaced knife guiding plates on the base, and a cutting device freely movable above the base on material supported thereby to be cut, said device comprising a body and a knife projecting downwardly from the body and engaged at opposite sides of its lower end by said guiding plates so that lateral wobbling or vibration of the knife is prevented.

3. A machine as claimed in claim 2, in which the space between the guiding plates is substantially the thickness of the knife, and in which the guiding plates are countersunk so their upper surfaces are flush with the base.

4. In a machine for cutting rubber, linoleum, or the like, in combination, a cutting base, a presser plate movable upon the base, means to clamp the plate against work on the base, closely spaced knife guiding plates on the base at one side of the presser plate and adapted to receive a cutting knife therebetween, a cutting device freely movable above the base on material supported thereby to be cut, said device comprising a body and a knife projecting downwardly from the body and engaged at opposite sides of its lower end by said guiding plates so that lateral wobbling or vibration of the knife is prevented, and handle means on the cutting device for applying manual pressure thereon in its movement to produce directly by moving pressure of the cutting device an ironing effect on the material at opposite sides of the line of cut simultaneously with the cutting operation.

5. In a machine for cutting rubber, linoleum, or the like, in combination, a cutting base, a presser plate movable upon the base, means to clamp the plate against work on the base, closely spaced knife guiding plates on the base, a cutting device freely movable above the base on material supported thereby to be cut, said device comprising a body and a knife projecting downwardly from the body and engaged at opposite sides of its lower end by said clamping plates so that lateral wobbling or vibration of the knife is prevented, and handle means on the cutting device for manual grasping and application of pressure thereto, enabling the lower surface of the cutting device contacting with the surface of the material being cut, to produce an ironing effect upon the material surfaces at opposite sides of the cut, as the cutting operation is being performed.

6. In a machine for cutting rubber, linoleum, or the like, in combination, a cutting base, a presser plate mounted upon the base for movement towards and away from the same, means for normally yieldably urging said presser plate towards the base to impart a clamping pressure upon the material to be cut while supported by the base, and cutting instrumentalities including a cutting knife freely movable above the base on the material supported thereby to be cut, said presser plate having one of its edges disposed for engagement with the cutting instrumentalities and constituting a guide for the latter during the cutting operation.

7. In a machine for cutting rubber, linoleum, or the like, in combination, a cutting base, a presser plate mounted upon the base for movement towards and away from the same, means for normally yieldably urging said presser plate towards the base to impart a clamping pressure upon the material to be cut while supported by the base, cam means mounted upon the presser plate and coacting with the base for lifting the presser plate away from the base to permit the material to be cut to be positioned beneath the presser plate, and cutting instrumentalities including a cutting knife freely movable above the base on the material supported thereby to be cut, said presser plate having one of its edges disposed for engagement with the cutting instrumentalities and constituting a guide for the latter during the cutting operation.

8. In a machine for cutting rubber, linoleum, or the like, in combination, a cutting base, a presser plate disposed at the upper side of the base and attached thereto at its opposite ends so as to be free to move towards and away from the base and having pivotal connection with the base at least at one end, spring means for normally yieldably urging the presser plate towards the base to impart a clamping pressure upon the material to be cut while supported by the base, and cutting instrumentalities including a cutting knife freely movable above the base on the material supported thereby to be cut, said presser plate having one of its edges disposed for engagement with the cutting instrumentalities and constituting a guide for the latter during the cutting operation.

9. In a machine for cutting rubber, linoleum, or the like, in combination, a cutting base, a presser plate disposed at the upper side of the base and attached thereto at its opposite ends so as to be free to move towards and away from the base and having pivotal connection with the base at least at one end, spring means for normally yieldably urging the presser plate towards the base to impart a clamping pressure upon the material to be cut while supported by the base, cutting instrumentalities including a cutting knife freely movable above the base on the material supported thereby to be cut, said presser plate having one of its edges disposed for engagement with the cutting instrumentalities and constituting a guide for the latter during the cutting operation, and a cam member pivotally mounted upon the end of the presser plate opposite to the end which is pivotally connected with the base, said cam member being engageable with the base to lift the presser plate against the action of the spring means and having an operating handle for imparting pivotal movement to the cam.

RAYMOND R. WARD.